Oct. 17, 1961     J. W. DOUGLAS     3,004,344
CARPENTER MULTIPLE USE MEASURING TOOL
Filed Oct. 21, 1957
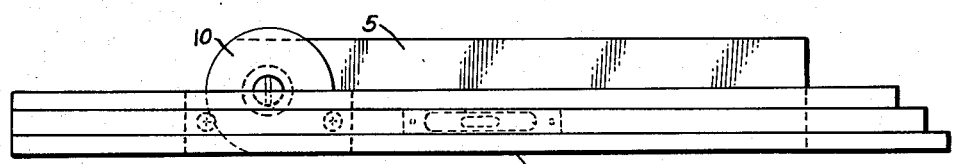
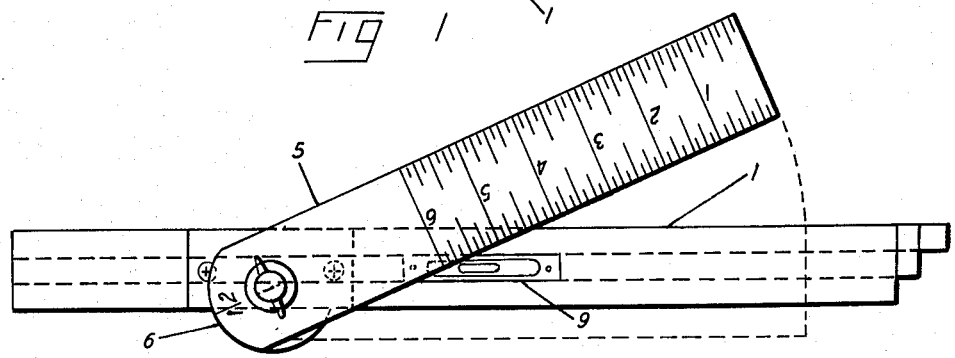
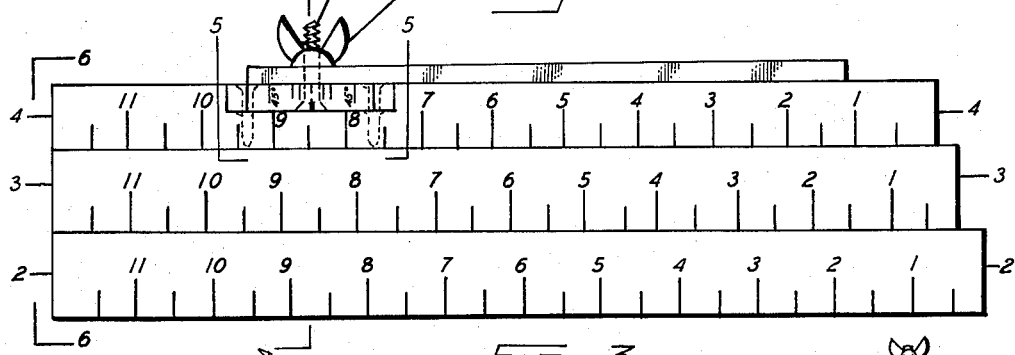
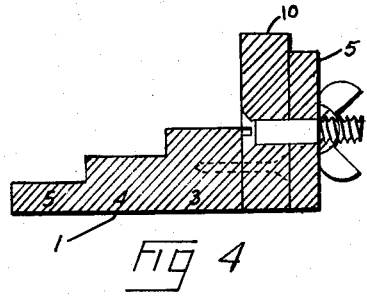 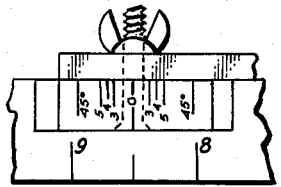 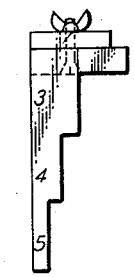
INVENTOR.
James Wallace Douglas
BY Chas. Denegre
Attorney

United States Patent Office 3,004,344
Patented Oct. 17, 1961

3,004,344
CARPENTER MULTIPLE USE MEASURING TOOL
James Wallace Douglas, R.F.D. 1, Siluria, Ala., assignor of fifty percent to E. G. Hall, Siluria, Ala.
Filed Oct. 21, 1957, Ser. No. 691,337
2 Claims. (Cl. 33—88)

This invention relates to a carpenter multiple use measuring tool. It has for its main objects to provide such a tool that will be highly satisfactory for its purpose, simple in structure, comparatively cheap to manufacture, easy to use for various kinds of measurements, easy to keep in working condition, and extremely durable.

A further object is to provide such a tool that will enable a carpenter to easily figure out in advance certain angles and joints in the building of roofs on buildings and for many other measuring requirements in the construction of buildings.

Other objects and advantages will appear from the drawing and description.

By referring generally to the drawing it will be observed that FIG. 1 is a side elevational view of the tool made according to this invention; FIG. 2 is an elevational view of the other side of the tool with one part moved away at an angle; FIG. 3 is a plan view of the entire tool; FIG. 4 is a sectional view on line 4—4 of FIG. 3; FIG. 5 is a detail view on line 5—5 of FIG. 4; and FIG. 6 is an end view on line 6—6 of FIG. 3.

Similar reference numerals refer to similar parts throughout the several views.

By referring to the drawing in detail it will be seen that the tool is provided with various numerals and lines representing certain measurements which will be described approximately, it being understood that the measurements are exact on the finished tool.

The main metal base 1 of the tool is two inches wide at its base and has three raised portions 2, 3 and 4, as plainly shown in FIGS. 1, 2 and 4. The body has two oppositely disposed planar sides and two ends one of which is planar while the other end is stepped as shown in FIGS. 1–3. Portion 2 is 13 inches long with numerals and lines dividing it into twenty-four spaces; portion 3 is 12.65 inches long with numerals and lines dividing it into twenty-four spaces; portion 4 is 12.37 inches long with numerals and lines dividing it into twenty-four spaces. On each end of portion 2 there is indented the numeral five; on each end of portion 3 there is indented the numeral four; on each end of portion 4 there is indented the numeral three. The attached bar 5 is eight and three-fourths inches long and has on its outer face a six inch regular measuring scale. In the center of the rounded end of bar 5 there is a slight slit along its center minor axis. A semicircular portion 10 is fixed to the base. The outer face of this portion is co-planar with a side of base 1 while the rounded upper face has scale markings thereon, as shown in FIG. 5, which are useful in setting bar 5. This bar is pivotally attached to portion 10 by bolt 7 and wing nut 8. One face of the base is provided with a spirit level structure 9 as plainly shown in FIG. 2.

From the foregoing it will appear that the tool is adapted to be set at different angles up to 90 degrees by adjusting the swingable bar and holding it in the position desired by the wing nut. As a result of setting the bar at certain angles pieces of building material for roofs and the like can be cut at predetermined angles for erecting same.

For laying out a common rafter which is to have a 3 inch rise for each foot of run the shorter portion 4 of base 1 is used. If the building has a span of 26 feet and therefore a run of 13 feet the carpenter would lay out 13 steps with the shorter portion 1 and cut the rafter after the last step has been made. Due to the fact that the length of the shorter portion is equal to the length of the hypotenuse of a right triangle having run of 12 inches and a rise of 3 inches the length of the rafter laid out by the carpenter is approximately 13' 5". The second or intermediate portion 3 and the longest portion 2 are used in a similar manner to lay out rafters having rises of 4 and 5 inches per foot of run respectively.

The various parts of the tool may be made of any material suitable for the purpose, but I prefer to use high grade rust proof metal, or aluminum or stainless steel; also the parts may be made in different sizes and capacities providing they conform to the required measurements heretofore described.

While I have shown and described the preferred embodiment of my invention, I do not wish to limit same to the exact and precise details of structure, and reserve the right to make all modifications and changes so long as they remain within the scope of the invention and the following claims.

Having described my invention I claim:

1. A carpenter multiple use measuring tool of the character described comprising, an oblong metal base, having a planar end and planar sides, said end of the base having its plane at a 90 degree angle compared to the planes of the sides of the base, said base having a stepped second end, said base consisting of three portions, one of said portions extending the full length of the base and approximately one-third the width of the base; and a stepped second portion shorter and higher than the other portion; and a third portion shorter and higher than the other portions; each of said portions having on its upper face a measuring scale of numerals and cross lines dividing it into 24 equal spaces; a substantially semi-circular portion having an outer face mounted on said third portion and positioned with its outer face flush with one of the planar sides of said base; a flat bar of metal having a rounded end portion and a measuring scale extending along the length of the bar, said semi-circular portion on the base having a hole through its center portion, said bar having a hole through its rounded end portion, a bolt being inserted through said holes, a wing nut being mounted on the bolt, said bar being mounted swingably on said bolt and being adapted to be held tight by said wing nut in various angle positions with relation to the base, said semi-circular portion being provided with indicia for positioning said bar with respect to said base; said base portions having numerals indented in their ends.

2. A carpenter multiple use measuring tool of the character described comprising, an oblong metal base having straight sides and a flat bottom face said base being formed by three different portions of different heights positioned parallel with each other, one end of the base having a vertical face at an angle of 90 degrees compared to the sides of the base, said portions being formed in three different lengths, identifying numerals indented in the end of each portion, each of said parallel portions having a measuring scale thereon consisting of numerals and lines dividing each portion into 24 equal spaces; a flat metal bar, said bar having a measuring scale on part of one of its faces, one end of the bar being rounded, a semi-circular portion mounted on the highest portion of the base, said semi-circular portion having a hole through its center, said bar having a hole through its rounded end, a bolt and wing nut, said bolt and wing nut being mounted with said bolt in said holes and the nut on the bolt providing means for holding the bar in various positions with respect to said base; a spirit level mounted in one of the sides of the said base.

References Cited in the file of this patent

UNITED STATES PATENTS

| | | |
|---|---|---|
| 387,966 | Beckwith | Aug. 14, 1888 |
| 751,727 | Grundeen | Feb. 9, 1904 |
| 761,272 | Wagniere et al. | May 31, 1904 |